United States Patent [19]

Sadakane

[11] Patent Number: 4,747,256
[45] Date of Patent: May 31, 1988

[54] LEVER MOUNTING STRUCTURE FOR LAWN MOWER

[75] Inventor: Hirofumi Sadakane, Kawachinagano, Japan

[73] Assignee: Kubota, Ltd., Osaka, Japan

[21] Appl. No.: 947,931

[22] Filed: Dec. 30, 1986

[30] Foreign Application Priority Data

Feb. 17, 1986 [JP] Japan .................................. 61-32510

[51] Int. Cl.$^4$ ........................ A01D 69/00; G05G 1/00
[52] U.S. Cl. ...................................... 56/11.3; 56/10.8; 74/480 R; 74/491
[58] Field of Search ...................... 56/11.3, 11.8, 11.4, 56/10.8, 10.5, 17.5, 255; 180/19.3; 74/480 R, 491

[56] References Cited

U.S. PATENT DOCUMENTS

| | | | |
|---|---|---|---|
| 4,127,980 | 12/1978 | Ferguson | 56/11.3 |
| 4,212,141 | 7/1980 | Miyazawa et al. | 56/11.3 |
| 4,224,996 | 9/1980 | Dobberpull | 180/19.3 |
| 4,466,233 | 8/1984 | Thesman | 56/11.3 |
| 4,538,401 | 9/1985 | Takamizawa et al. | 56/10.8 |

Primary Examiner—John Weiss
Attorney, Agent, or Firm—Jordan and Hamburg

[57] ABSTRACT

A control lever mounting structure for a walking operator type grass cutting vehicle, comprising a steering handle including a grip portion, a right lever support and a left lever support. A first control lever operatively connected to a cutting blade drive clutch is attached to the left lever support to be pivotable in fore-and-aft directions of the vehicle between a clutching position adjacent the grip portion and a declutching position away from the grip portion. A second control lever operatively connected to a wheel drive clutch is attached to and extending between the right and left supports to be pivotable in the fore-and-aft directions of the vehicle between a clutching portion adjacent the grip portion and a declutching position away from the grip portion. The second control lever is pivotable on a horizontal axis extending transversely of the vehicle, whereas the first control lever is pivotable on an axis inclined relative to the horizontal axis. Thus, the first control lever is movable sideways as it makes a pivotal movement, whereby the first and second control levers are in contact with each other when in the clutching positions adjacent the grip portion and separated from each other when in the declutching positions away from the grip portion.

11 Claims, 2 Drawing Sheets

LEVER MOUNTING STRUCTURE FOR LAWN MOWER

BACKGROUND OF THE INVENTION

(1) Field of the Invention

The present invention relates to a control lever mounting structure for a grass cutting vehicle such as an automotive lawn mower of the type operated by a walking person. More particularly, the invention relates to a control lever mounting structure including a steering handle carrying a first control lever operatively connected to a cutting blade drive clutch and a second control lever operatively connected to a wheel drive clutch, each of the control levers being pivotable in fore-and-aft directions of the vehicle between a clutching position adjacent a grip portion of the steering handle and a declutching position away from the grip portion, and each control lever being biased to the declutching position.

(2) Description of the Prior Art

A known lawn mower of the type described above is capable of a grass cutting operation while propelling itself, a grass cutting operation while being pushed by a walking operator, and self-propelled traveling with the cutting blade assembly at rest. A certain known mower is capable of the grass cutting operation while propelling itself with the steering handle and clutch control levers easily operable by one hand of the operator. Such a mower is disclosed, for example, in U.S. Pat. No. 4,538,401. This known tractor includes a lever engaging mechanism for effecting a releasable engagement between a first control lever operatively connected to a blade drive clutch and a second control lever operatively connected to a wheel drive clutch. By putting the lever engaging mechanism out of action, the first and second control levers are shiftable to their respective clutching positions independently of each other. When the lever engaging mechanism is actuated, the first control lever is retained in the clutching position by a supporting action of the second control lever in the clutching position which is gripped together with the sterring handle by the operator.

However, this prior example requires the lever engaging mechanism to be specially provided as an element not integral with the levers, which results in a complicated construction. Furthermore, a troublesome operation for bringing the lever engaging mechanism into and out of action is necessary in order to permit the first and second control levers to shift independently of each other and to permit the first control lever to be supported by the second control lever. Summary of the Invention Having regard to the above-noted state of the art, the object of the present invention is to provide a control lever mounting structure simple in construction as well as in operation and capable of permitting the first and second control levers to be shifted to the clutching positions independently of each other and permitting the first control lever to be supported by the second control lever without necessitating the lever engaging mechanism.

In order to achieve this object, a lever mounting structure according to this invention comprises a steering handle including a grip portion, a first control lever operatively connected to a cutting blade drive clutch and attached to the steering handle to be pivotable on a first axis to shift in force-and-aft directions of the vehicle between a clutching position adjacent the grip portion and a declutching position away from the grip portion, and a second control lever operatively connected to a wheel drive clutch and attached to the steering handle to be pivotable on a second axis to shift in the fore-and-aft directions of the vehicle between a clutching position adjacent the grip portion and a declutching position away from the grip portion, wherein the first axis and the second axis are inclined relative to each other so that at least one of the first and second control levers is movable sideways as said one of the levers makes a pivotal movement, and as a result the first and second control levers are in contact with each other when in the clutching positions adjacent the grip portion and separated from each other when in the declutching positions away from the grip portion.

In the above construction, the first axis on which the first control lever is pivotable is inclined relative to the second axis on which the second control lever is pivotable. This novel construction constitutes an improvement upon the known construction in that the lever engaging mechanism for establishing the releasable engagement between the first and second levers is no longer required. According to the present invention the first axis is inclined relative to the second axis such that the first and second control levers in their respective declutching positions are separated from each other. Thus, one of the control levers may be shifted to the clutching position leaving the other control lever in the declutching position. In the respective clutching positions adjacent the grip portion of the steering handle, one of the levers which is shifted to the clutching position after the other lever may support the other lever when the operator grips only the steering handle and one of the levers, whereby the other lever also is retained in the clutching position.

This construction permits the vehicle to engage in the grass cutting operation while propelling itself, to engage in the grass cutting operation while being pushed by a walking operator and to travel with the cutting blade assembly at rest. One of these three modes may readily be selected by shifting one or both of the control levers. Now that the lever engaging mechanism is dispensed with, the lever mounting structure is simplified and manufactured at low cost. In this connection, the present invention also dispenses with the special adjustments that were necessary with the prior art for permitting the two control levers to be shiftable independently of each other and for permitting one of the control levers to support the other.

It is conceivable to cause the two control levers to approach each other in the clutching positions and separate from each other in the declutching positions by means of parallel pivotal axes. However, it would then be necessary for the two parallel axes to be far apart from each other, which would result in a lever mounting structure having large dimensions in the fore-and-aft direction of the vehicle. The relatively inclined pivotal axis arrangement according to the present invention has the advantage of small fore-and-aft dimensions of the lever mounting structure projecting rearwardly of the steering handle.

Other objects and advantages of the present invention will be apparent from the following description.

BRIEF DESCRIPTION OF THE DRAWINGS

The drawings illustrate a control lever mounting structure of a lawn mower embodying the present invention, in which.

DESCRIPTION OF THE PREFERRED EMBODIMENT

Figure 1:
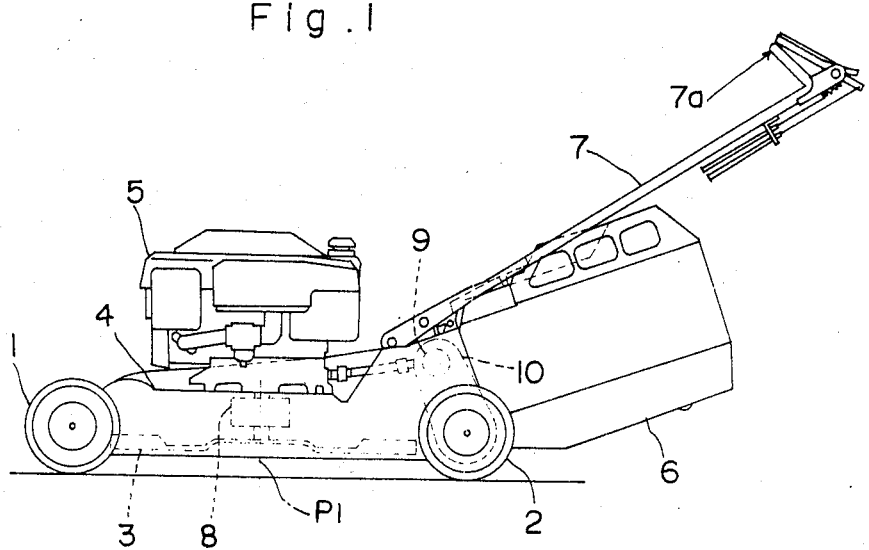
FIG. 1 is a side elevation of the lawn mower.
Figure 2:
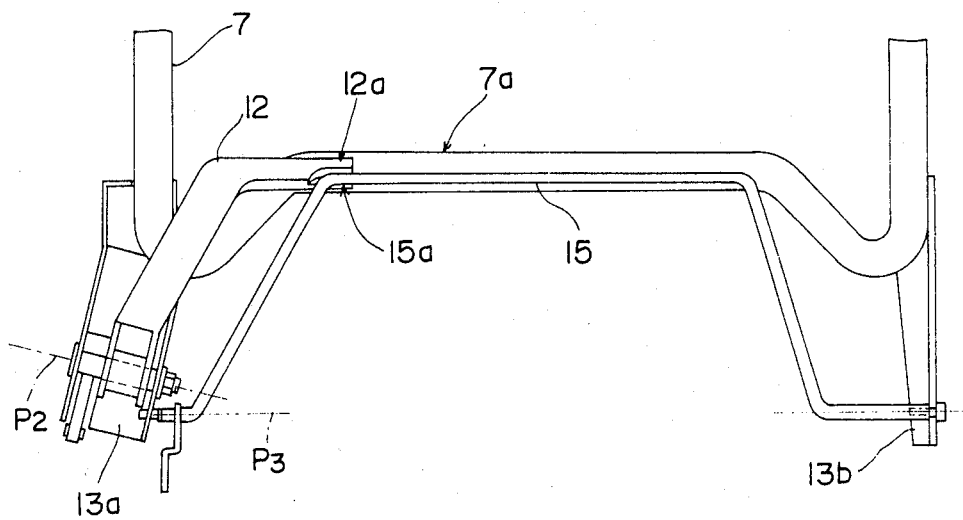
FIGS. 2 and 3 are plan views of the control lever mounting structure.
Figure 3:
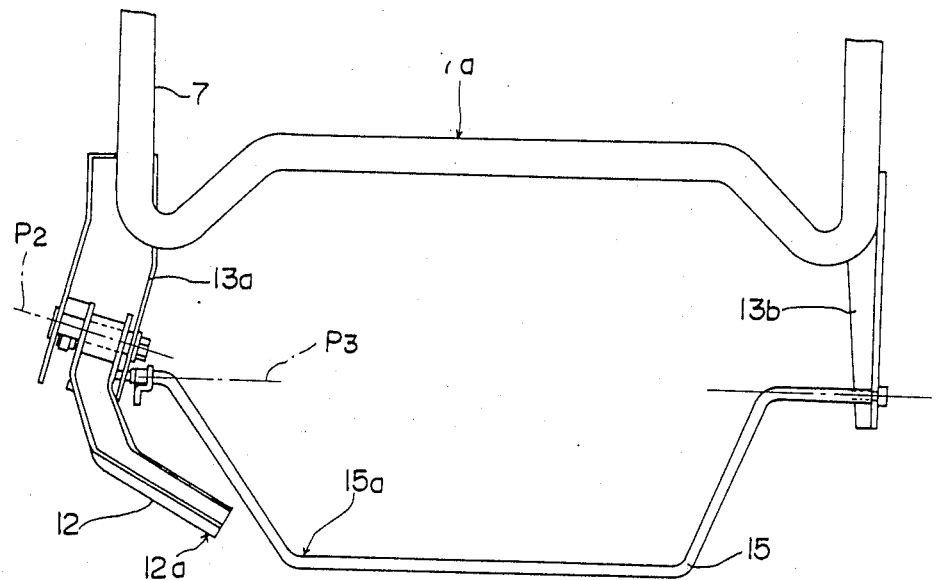
Figure 4:
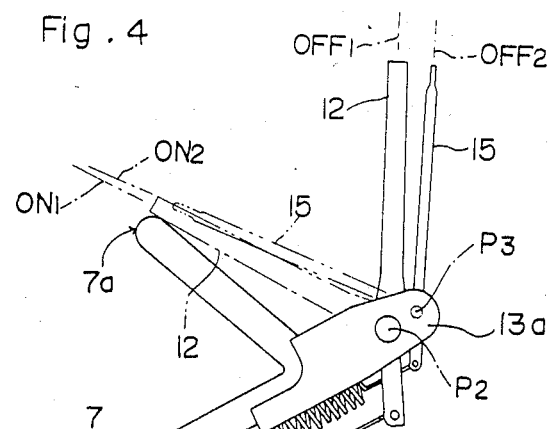
FIG. 4 is a side view of the control lever mounting structure.

Referring to FIG. 1, a walking operator type lawn mower comprises front wheels 1, rear wheels 2, a cutting blade assembly 3 rotatable on a vertical axis P1, a blade housing 4 acting also as a chassis, and an engine 5 mounted on the blade housing 4 for driving the rear wheels 2 and the blade assembly 3. A grass collecting container 6 and a steering handle 7 extend rearwardly from the blade housing 4.

The blade housing 4 contains a clutch brake 8 for driving and stopping the blade assembly 3. The clutch brake 8 is biased to a disengaged position to brake the cutting blade 3. Further, a wheel drive clutch 9 is mounted in a transmission case 10 switchable between an engaged position for driving the rear wheels 2 and a disengaged position for permitting free rotation of the rear wheels 2. The wheel drive clutch 9 is biased to the disengaged position.

The clutch brake 8 and wheel drive clutch 9 are controllable through a control structure as shown in FIGS. 2 through 5. The clutch brake 8 is operatively connected through a release wire 11 to a short, angled first control lever 12 having a free end 12a. The first control lever 12 is attached to a lever support 13a mounted on a lefthand side of the steering handle 7, to be pivotable on a first axis P2 in fore-and-aft directions of the mower. The clutch brake 8 is disengaged to brake the blade assembly 3 when the first control lever 12 is shifted rearwardly to a first position OFF1 away from a grip portion of the handle 7. The clutch brake 8 is engaged to drive the blade assembly 3 when the first control lever 12 is shifted forwardly to a second position ON1 adjacent to the grip portion 7a of the handle 7. The operator may hold the first control lever 12 in the second position ON1 together with the grip portion of handle 7. The first control lever 12 is biased to the first position OFF1 by a restoring force of the clutch brake 8, so that the first control lever 12 automatically returns from the second position ON1 to the first position OFF1 when the operator releases the first control lever 12.

The wheel drive clutch 9 is operatively connected through a release wire 14 to a long, angled second control lever 15 extending transversely of the mower. The second control lever 15 is attached at one end thereof to the lefthand lever support 13a and at the other end to a righthand lever support 13B mounted on the steering handle 7, to be pivotable on a horizontal first axis P2 in the fore-and-aft directions of the mower. The wheel drive clutch 9 is disengaged when the second control lever 15 is shifted rearwardly to a first position OFF2 away from the grip portion of the handle 7, and is engaged when the second control lever 15 is shifted forwardly to a second position ON2 adjacent to the grip portion 7a. As in the case of first control lever 12, the operator may hold the second control lever 15 in the second position ON2 together with the grip portion of handle 7. The second control lever 15 is biased to the first position OFF2 by a disengagement restoring force of the wheel drive clutch 9, so that the second control lever 15 automatically returns from the second position ON2 to the first position OFF2 when the operator releases the second control lever 15.

Figure 5:
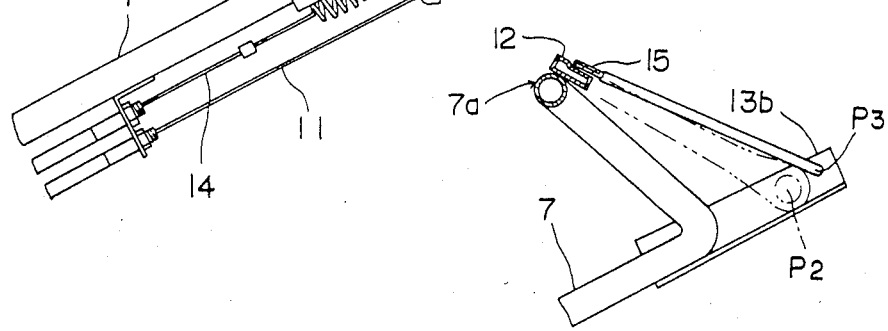
FIG. 5 is a side view, partly broken away, of the control lever mounting structure.

The first axis P2 is inclined with respect to the second axis P3 when viewed from above the mower, such that first axis P2 extends progressively forwardly as it extends laterally outwardly of the mower. Therefore, the first control lever 12 moves sideways and progressively inwardly of the mower as the first control lever 12 pivots on the first axis P2 forwardly of the mower. Because of this sideways movement, the free end 12a of the first control lever 12 in the second position ON1 is contactable by a bent portion 15a of the second control lever 15 in the second position ON2 as shown in FIG. 5. When in the respective first positions OFF1 and OFF2, the first control lever 12 and second control lever 15 are separated from each other as shown in solid lines in FIG. 4. Because the two control levers 12 and 15 are separable, they may be shifted independently of each other to their respective second positions ON1 and ON2. It will be appreciated that, by shifting the first control lever 12 to the second position ON1 first and then the second control lever 15 to the second position ON2, the operator need hold only the handle 7 and the second control lever 15 to retain the first control lever 12 in the second position ON1 as supported by the second control lever 15 in the second position ON2.

While in the foregoing embodiment the first axis P2 is inclined such that the first axis P2 is disposed forwardly as it extends outwardly of the mower, the first axis P2 may be inclined both forwardly and upwardly.

Further, in the illustrated embodiment the second control lever 15 has large dimensions transversely of the mower to define a long grip portion, and the second control lever 15 is pivotable on the horizontal second axis P3 extending transversely of the mower to prevent the second axis P3 from becoming sideways displaced when the second control lever 15 makes the pivotal movement. The above construction may be modified such that the first axis P2 is horizontal and extends transversely of the mower with the second axis P3 inclined in the fore-and-aft direction or in both the fore-and-aft and vertical directions of the mower. In another modification, both the first and second axes P2 and P3 may be inclined in the fore-and-aft direction or in both the fore-and-aft and vertical directions of the mower. In other words, it will serve the purpose if the first and second axes P2 and P3 are inclined relative to each other in an appropriate manner.

The clutch brake 8 may be replaced by a clutch in a practical application of the invention.

The described lever mounting structure according to the present invention may be employed not only for a lawn mower but for other types of vehicle suited for cutting grass or the like of low growth.

What is claimed is:

1. A control lever mounting structure for a walking operator type grass cutting vehicle, comprising;
    a steering handle including a grip portion,
    a first control lever operatively connected to a cutting blade drive clutch and attached to said steering handle to be pivotable on a first axis to shift in fore-and-aft directions of the vehicle between a clutching position adjacent said grip portion and a declutching position away from said grip portion, and a second control lever operatively connected to a wheel drive clutch and attached to said steering handle to be pivotable on a second axis to shift in the fore-and-aft directions of the vehicle between a clutching position adjacent said grip portion and a declutching position away from said grip portion, wherein said first axis and said second axis are inclined relative to each other so that at least one of said first and second control levers is movable sideways as said one of the levers makes a pivotal movement, whereby as a result of said relative inclination said first and second control levers are in contact with each other when in said clutching positions adjacent said grip portion and separated from each other when in said declutching positions away from said grip portion, said second control lever being positioned, when both of said levers are in said clutching position, to block said first control lever and inhibit the return of said first control lever to said declutching position.

2. A lever mounting structure as claimed in claim 1 wherein said first control lever is a short, angled lever attached at one end thereof to said steering handle, and said second control lever is a long, angled lever extending transversely of the vehicle and attached at opposite ends thereof to said steering handle, said second axis being a horizontal axis extending transversely of the vehicle.

3. A lever mounting structure as claimed in claim 1 wherein said first axis is inclined such that said first axis is disposed progressive forwardly as said first axis extends laterally outwardly of the vehicle.

4. A walking operator type grass cutting vehicle, comprising;

a blade housing containing a cutting blade assembly and a blade drive clutch, a transmission case containing a wheel drive clutch, a steering handle extending rearwardly from said blade housing and including a grip portion, a first control lever operatively connected to said cutting blade drive clutch and attached to said steering handle to be pivotable on a first axis to shift in fore-and-aft directions of the vehicle between a clutching position adjacent and grip portion and a declutching position away from said grip portion, and a second control lever operatively connected to said wheel drive clutch and attached to said steering handle to be pivotable on a second axis to shift in the fore-and-aft directions of the vehicle between a clutching position adjacent said grip portion and a declutching position away from said grip portion, wherein said first axis and said second axis are inclined relative to each other so that at least one of said first and control levers is movable sideways as said one of the levers makes a pivotal movement, whereby as a result of said relative inclination said first and second control levers are in contact with each other when in said clutching positions adjacent said grip portion and separated from each other when in said declutching positions away from said grip portion, said second control lever being positioned, when both of said levers are in said clutching position, to block said first control lever and inhibit the return of said first control lever to said declutching position.

5. A grass cutting vehicle as claimed in claim 4 wherein said first control lever is a short, angled lever attached at one end thereof to said steering handle, and said second control lever is a long, angled lever extending transversely of the vehicle and attached at opposite ends thereof to said steering handle, said second axis being a horizontal axis extending transversely of the vehicle.

6. A grass cutting vehicle as claimed in claim 4 wherein said first axis is inclined such that said first axis is disposed progressive forwardly as said first axis extends laterally outwardly of the vehicle.

7. A grass cutting vehicle as claimed in claim 4 wherein said first and second control levers are biased to the declutching positions, respectively.

8. In a mowing machine having a steering handle, a cutting blade clutch, a first lever for controlling the cutting blade clutch, and means for moving the mowing machine including a drive clutch and a second lever for controlling the drive clutch, said first and second levers being mounted for movement about first and second pivot axes respectively for operation by an operator controlling said steering handle, said levers each having a clutching position and a declutching position at which the respective clutch is clutched and declutched respectively, the improvement wherein said axes are relatively inclined with respect to one another, said second lever being mounted to hold said first lever in said clutching position when said second lever is moved into its clutching position as a result of said relative inclination, the pivot axes of said levers being positioned to inhibit holding of either lever by the other when both of said levers are in their declutching position.

9. The mowing machine of claim 8 wherein said mowing machine has a fore-and-aft direction, the axis of said second lever extends substantially perpendicularly to said fore-and-aft direction, and the axis of said first lever enables movement of said first lever at an acute angle to said fore-aft direction.

10. The mowing machine of claim 8 wherein said second and first levers are positioned to enable holding of said first lever between said handle and said second lever in said clutching position.

11. The mowing machine of claim 8 wherein said mowing machine has a fore-and-aft direction, the axis of said second lever extends substantially perpendicular to said fore-and-aft direction, said first lever being pivoted adjacent one side of said handle, and the axis of said first lever extends in a forward direction of said machine from said one side of said handle.

* * * * *